United States Patent [19]

Merrick et al.

[11] 4,176,269

[45] Nov. 27, 1979

[54] CLAMPING APPARATUS FOR WELDING CIRCUMFERENTIAL ARTICLES

[75] Inventors: George J. Merrick, Franklin; George E. Cook, Brentwood; Donald D. Modglin, Nashville, all of Tenn.

[73] Assignee: Merrick Welding International, Inc., Nashville, Tenn.

[21] Appl. No.: 857,226

[22] Filed: Dec. 5, 1977

Related U.S. Application Data

[62] Division of Ser. No. 654,975, Feb. 3, 1976, Pat. No. 4,145,593.

[51] Int. Cl.² ............................................. B23K 9/02
[52] U.S. Cl. ............................ 219/60 A; 219/59.1; 219/161; 228/44.5; 269/43
[58] Field of Search ............ 219/60 A, 60 R, 59.1, 219/158–161, 121 R, 121 EM; 61/110, 111; 228/44.5; 269/45, 42, 43; 156/158; 65/152

[56] References Cited

U.S. PATENT DOCUMENTS

| | | | |
|---|---|---|---|
| 2,737,140 | 3/1956 | Totten | 219/161 X |
| 2,795,689 | 6/1957 | McNutt | 219/60 R |
| 3,084,244 | 4/1963 | Rieppel et al. | 219/60 A |
| 3,088,018 | 4/1963 | Ross et al. | 219/60 A |
| 3,427,428 | 2/1969 | Nelson et al. | 219/60 R X |
| 3,483,352 | 12/1969 | Schollhammer | 219/60 A X |
| 3,618,158 | 3/1971 | Akhunov et al. | 269/43 X |
| 3,668,359 | 6/1972 | Emmerson | 219/161 |
| 3,783,232 | 1/1974 | Mengeringhausen et al. | 219/60 A |
| 3,919,037 | 11/1975 | Miller | 156/158 |

Primary Examiner—Bruce A. Reynolds
Assistant Examiner—Paschall
Attorney, Agent, or Firm—Jones, Thomas & Askew

[57] ABSTRACT

Apparatus for rapid and automatic welding of joints which interconnect sections of pipe, and in particular oil or gas transmission pipe. The system includes at least one torch transport assembly which simultaneously moves a plural number of welding torches along a path parallel to the pipe joint being welded. The torch transport assembly includes track segments which surround circumferential portions of the pipe joint, with a welding torch carrier and multiple torches being independently movable along each track segment. The torch transport assembly is mounted on a support apparatus which is rigidly clamped to the pipe sections during welding, and which permits the torch transport assembly to be rapidly positioned in rough alignment with a pipe joint. The torch transport assembly and selected operating parameters of each welding torch are adjusted to accurately position each torch with respect to the pipe joint, and to repeatably provide programmed welding parameters resulting in a uniform pipe joint weld. The present system is disclosed in the context of hot-wire gas-tungsten arc welding torches, and in the operating environment of out-of-position joint welding.

10 Claims, 5 Drawing Figures

CLAMPING APPARATUS FOR WELDING CIRCUMFERENTIAL ARTICLES

This is a division of application Ser. No. 654,975, filed Feb. 3, 1976, now U.S. Pat. No. 4,145,593.

This invention relates in general to welding and in particular to off-axis welding of pipeline in which a welding torch is traversed with respect to a relatively stationary workpiece.

Transmission pipelines are frequently used to transport fluid products for substantial distances, with oil and gas transmission pipelines being but two well-known examples. Such pipelines are generally constructed of individual pipe sections that are joined together by welding, and it is important that each welded pipe joint meet the criteria necessary for safe operation of the pipeline. Not only is the detection and repair of defective joints an extremely expensive undertaking, particularly where the pipeline is buried underground or submerged beneath the sea, but the existence of a defective weld joint creates a hazard of catastrophe in the case of pipelines which carry flammable products.

The separate lengths of pipe which make up an oil or a gas transmission pipeline are typically interconnected by electric-arc welding, and many types of welding techniques are used or proposed in the art for that purpose. Perhaps the simplest welding technique is shielded metal arc welding, commonly known as "stick welding", in which one or more persons manually weld each joint using hand-held welding torches of conventional design. Since each welded joint of a typical pipeline actually consists of several separate weld segments or layers, known as "passes", manual welding techniques are time-consuming and costly in view of the large number of welded pipe joints to be welded in a pipeline extending for many miles. The relative slowness of manual and other conventional welding techniques is particularly troublesome in pipe laying operations where wages and equipment expenses provide a costly overhead which must be rationalized by maximizing the number of acceptable welds that can be produced per unit of time.

Lay-down operations for underwater pipeline typically present an extreme example of operating overhead costs, since all pipe welding and related operations must take place on a barge or other vessel with maintenance costs in addition to the costs of crew and equipment directly related to laying the pipeline. Such barges are subjected to the wave motion of the prevailing sea state, moreover, so that even relatively massive barges frequently present a moving work surface relative to the completed portion of pipeline which extends from the barge into the sea. It has been found that the pipeline cannot be rigidly clamped to the deck of the lay-down barge, since sea-induced movements of the barge can readily damage the pipeline. Such problems further complicate the task of welding sections of pipe to the completed portion of the pipeline.

Welding devices have been proposed which traverse a welding torch about the circumference of a pipe joint while welding the joint. Since it is obviously impossible to rotate the joint end of a pipeline which may extend for many miles from a laydown barge (or any other joint welding site), automatic pipe welding equipment generally traverse a welding torch circumferentially about the pipe joint. Those skilled in the art will recognize that "off-axis" welding, that is, welding applications where the welding torch departs from an upright vertical position, becomes increasingly difficult as the welding torch departs the 12 o'clock or upright position in its passage around the pipe joint. The weld puddle is subjected to natural forces including gravity, surface tension, and capillary attraction within the grooved joint being welded, and the net force acting on the puddle constantly changes as the torch traverses about the circumference of a pipe joint which is in a nonhorizontal plane. When the torch is welding at the 6 o'clock position, maximum care must be exercised to prevent the weld puddle from falling out of the weld by gravity.

It has been proposed to overcome gravitational pull-out of the weld puddle during off-axis welding by applying pulsed welding current to the torch, so that the weld puddle will slightly congeal during each "off" portion of the pulsed weld current. The operating speed of welding torches receiving pulsed welding current must be correspondingly reduced, however, and it is possible that the welds which are produced by the pulse-induced intermittent partial cooling may have undesirable metallurgical properties.

The speed at which a pipejoint can be welded is determined by the maximum rate at which the welding torch can deposit weld metal while traversing a pipe joint which is in a nonhorizontal plane. While gas metallic arc (MIG) welding torches generally have a relatively high rate of metal deposition, such torches generally produce welds that are nonuniform and difficult to repeatably obtain. Gas tungsten arc (TIG) welding torches are known to produce a pipe joint weld of superior and more repeatable quality, although the metal deposition rate for TIG welding torches is relatively slow. A development known as the hot-wire TIG torch, in which electric current is passed through the filler wire to preheat the filler wire which is melted in the weld puddle, is known to produce a substantially increased rate of metal deposition, relative to conventional TIG welding. The lack of sufficiently precise and repeatable weld parameter control of prior-art hot-wire TIG welding torches, however, along with the aforementioned problem of off-axis weld puddle control and related problems, have heretofore kept the metal-deposition rates of hot-wire TIG torches from being fully realized in pipeline welding applications. A description of hot-wire TIG welding is set forth in U.S. Pat. No. 3,122,629.

Accordingly, it is an object of the present invention to provide an improved apparatus for welding along a predetermined path of workpieces such as pipe joints or the like.

It is another object of the present invention to provide apparatus for automatically welding pipe joints and the like, at an improved rate of metal deposition and with an improved quality of weld.

It is another object of the present invention to provide a pipeline welding system in which precise alignment of one or more welding torches can be accomplished with only rough positioning of one or more torch carriers in relation to a pipe joint being welded.

Stated in general terms, the present invention comprises a pipe-engaging support apparatus which positively engages two sections of pipe adjacent a common joint; and a welding torch transport means which is supported by the support means, and which is movable relative to the support means for positioning in proximity to the pipe joint. Stated somewhat more specifically, the torch transport means is connected to the support means for movement along several degrees of freedom relative to the support means and the pipeline sections engaged by the support means, so that welding torches associated with the torch transport means are maintained in fixed relation with the pipeline irrespective of pipeline movements relative to a barge deck or other off-pipeline work station. The torch transport means includes track sections which are parallel to the joint, and carriages which are movable along each track. Each carriage supports one or more welding torches in angular offset relation, relative to the circumference of the pipe joint to be welded. Each carriage as well as each welding torch carried by the plural carriage, is independently operable to provide preselected optimal welding parameters for the particular circumferential position of each welding torch relative to the circumferential pipe joint being welded. Automatic control of the arc length for each torch, as well as electrical adjustment of the center point of weld-joint transverse oscillation for each torch, permits the torches to independently maintain a precision track about the pipe joint irrespective of possible eccentricity of the support means and carriages with respect to the pipe joint as disclosed in copending application Ser. No. 654,975 filed Feb. 3, 1976.

The foregoing and other objects and advantages of the present invention will become more readily apparent from the disclosed preferred embodiment as described below with respect to the drawings, in which.

SUPPORT APPARATUS

Figure 1:
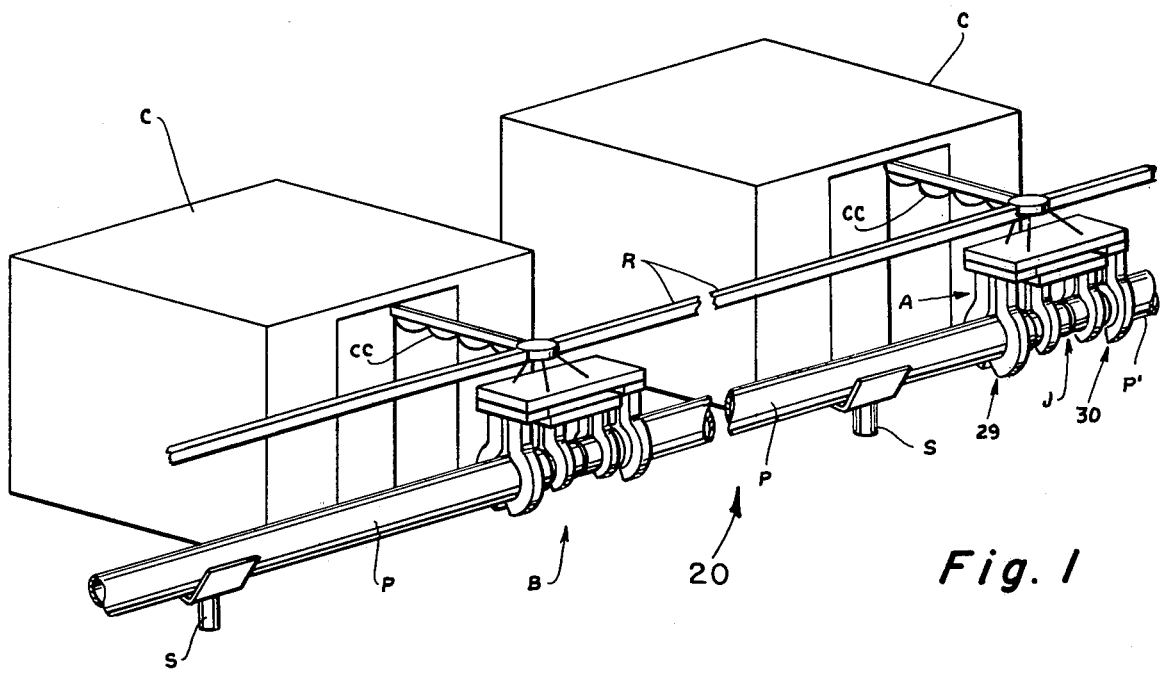
FIG. 1 is a pictorial view of a two-station pipeline welding system according to the disclosed embodiment of the present invention.

Turning to FIG. 1, there is shown generally at 20 a two-station pipeline welding system comprising a first welding station A and a second welding station B. Each of the welding stations A and B is shown as being suspended from a rail R which is supported above and generally parallel to the several depicted sections of pipe P. The pipe section P' may arbitrarily be considered to be the head-end section of an already-completed pipeline of indefinite length, while the other sections of pipe P depicted in FIG. 1 represent pipe sections which are in the process of being welded onto the pipe section P' to constitute an extension of the pipeline. Support members S may be provided for supporting the several pipe sections P, and it will be understood that suitable support means (not shown) is provided to maintain the rail R in the depicted position.

Associated with each welding station A and B is a separate control room C, which typically houses the power supplies and operational control apparatus associated with each of the welding stations. Welding power and control signals are supplied to each welding station through suitable cables CC.

Those skilled in the art of pipeline welding will understand that a weld interconnecting two sections of pipe is typically composed of several separately-applied welding passes. The first such pass, typically called the "root pass", mechanically joins together the adjacent ends of two pipe sections. The root pass may be followed by a "hot pass", and then by one or more "fill passes" which primarily serve to fill the space between abutting ends of the pipe sections with filler metal, and the final or "cap pass" provides the exterior surface of the welded joint. It is frequently desirable to provide the root pass and one or more fill passes at a first welding station A, for example, while the remaining fill passes and the cap pass may be provided at a second welding station B. It will be understood, however, that more than the two disclosed welding stations may be employed in a typical production pipeline welding situation; it should also be understood that each of the welding stations A and B disclosed herein can be identical in construction, and only a single such station may be provided for all welding passes of each pipe joint.

Figure 2:
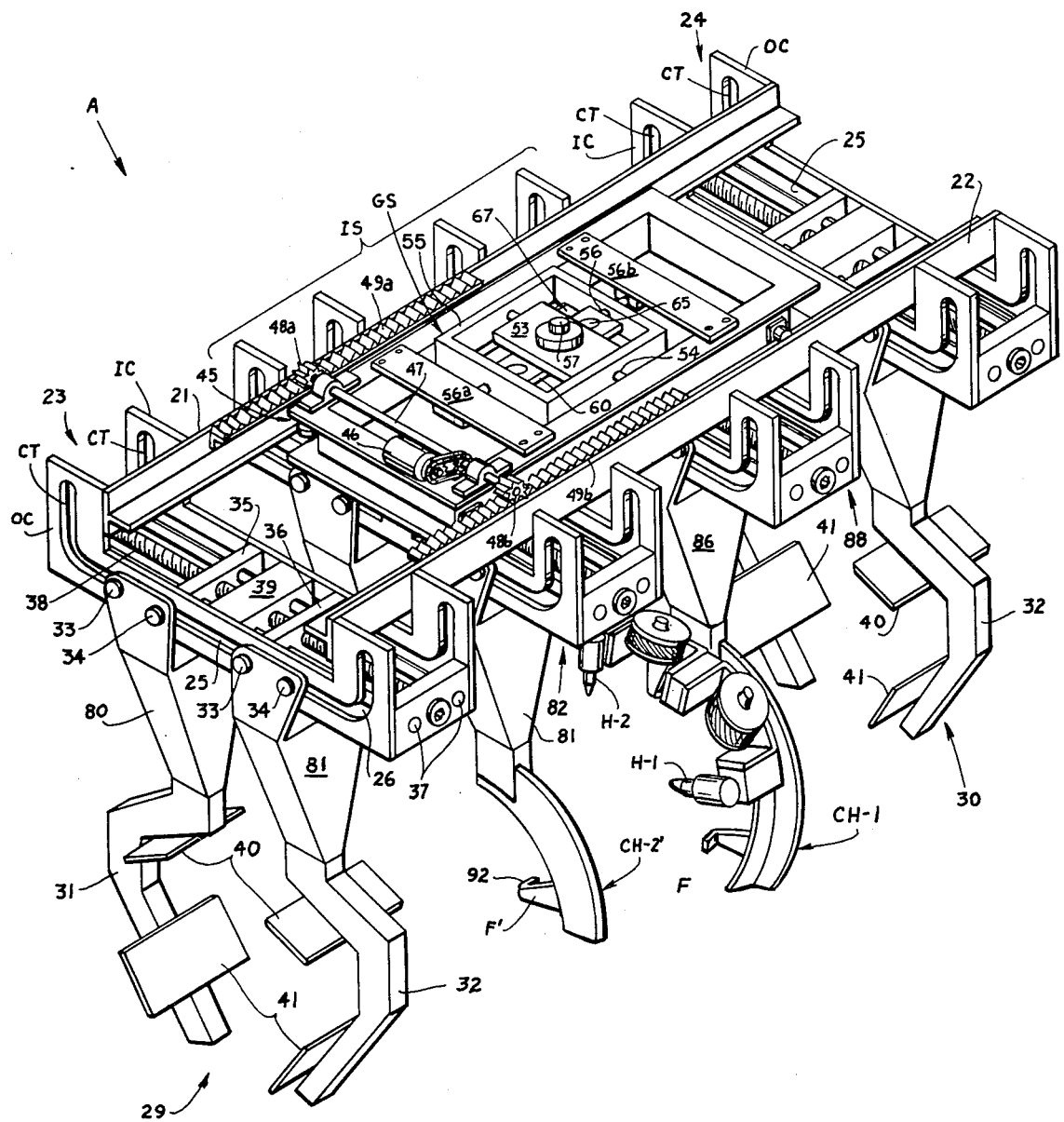
FIG. 2 shows a pictorial view of one welding station according to the disclosed embodiment.

Turning to FIG. 2, the welding station A is seen to have an outer frame provided by the elongated rails 21 and 22. Respective ends of the rails 21 and 22 are rigidly attached to the clamp cam assemblies 23 and 24, with each such clamp cam assembly including an outer cam plate OC, positioned adjacent the outer extremities of the respective rails, and an inner cam plate IC spaced inwardly therefrom. Each of the outer cam plates OC and inner cam plates IC contain an internal cam track CT, with each cam track CT having a substantially level elongated portion 25 of each cam track CT forms a continuous interconnection with end portions 26 which extend upwardly from the elongated portions.

Depending downwardly from each of the clamp cam assemblies 23 and 24 is a corresponding pair of outer clamp assemblies 29 and 30, each of which includes the separate outer clamp arms 31 and 32. Each of the outer clamp arms 31 and 32 is mounted for sliding movement along a corresponding cam track CT by a pair of bearing members 33 and 34, with each bearing member 34 being carried by a block 35 mounted within the outer cam plate OC and inner cam plate IC for sliding movement along a pair of guide rods 37. Each of the sliding blocks 35 and 36 engages the lead screw 38 which is rotatably mounted between the two guide rods 37, and a suitable motor 39 is provided to selectably rotate the lead screw in either direction. The lead screw 38 has counter-rotating threads respectively engaging the blocks 35 and 36, so that rotation of the lead screw in a given direction moves the blocks in opposite directions relative to each other. The outer clamp arms 31 and 32 translate laterally away from the pipe section P as the lead screw 38 turns in the proper direction, while the sliding blocks 33 and 34 travel along the level portion 25 of the cam track CT. As the blocks 34 move into the upturned portions 26, however, each outer clamp arm pivots about the block 33 to swing completely free of the pipe section.

Each of the outer clamp arms 31 and 32 extends downwardly from the clamp cam assembly 23, for example, to a lower terminus configured to surround and clamp onto the exterior of a pipe section P without puncturing or otherwise damaging the pipe exterior. Each of the outer clamp arms 31 and 32 carries a pair of clamping plates 40 and 41 which are disposed on the respective clamp arms to make proximately tangential contact with the exterior of a pipe section.

An inner support frame 45 is mounted on the rails 21 and 22 for longitudinal sliding movement therealong, between the clamp cam assemblies 23 and 24. The inner support frame 45 is traversed along the rails 21 and 22 by a drive mechanism including the motor 46 which is mounted on the inner support frame, and which drives the shaft 47 the ends of which are provided with gears 48a and 48b meshing with rack gears 49a and 49b mounted on respective rails 21 and 22. Operation of the motor 46 propels the inner support frame 45 in a selected direction along the rails 21 and 22. When the outer clamp assemblies 29 and 30 are clamped onto adjacent pipe sections P and P', as shown in FIG. 1, it will be understood that the inner support frame 45 is longitudinally movable relative to the pipe joint J between the two pipe sections.

The inner support frame 45 carries a gimbal support assembly GS, which in turn carries an inner assembly IS with several degrees of freedom relative to the inner support frame 45. The inner assembly, which is explained in detail below, includes apparatus for supporting the plural welding heads and for positioning the welding heads in concentric location with respect to the pipe joint J.

The gimbal support assembly GS, as best seen in FIG. 2, includes a gimbal frame 55 which is pivotally supported by the axis 56 between lateral support members 56a and 56b which extend between the two longitudinal sides of the inner support frame 45, so that the gimbal frame can pivot about the axis 56 which is parallel to the longitudinal axis of the pipe sections P onto which the outer clamp assemblies 29 and 30 are clamped. The support plate 53 is mounted within the gimbal frame 55 on axis 54 which is transverse to the axis 56, and another support plate 60 is mounted immediately below the plate 53. The plates 53 and 60 are interconnected by the vertical pivot connection 57, so that the support plate 60 is supported by the pivot connection 57 for rotation about an axis which is perpendicular to the axes 54 and 56.

Figure 3A:
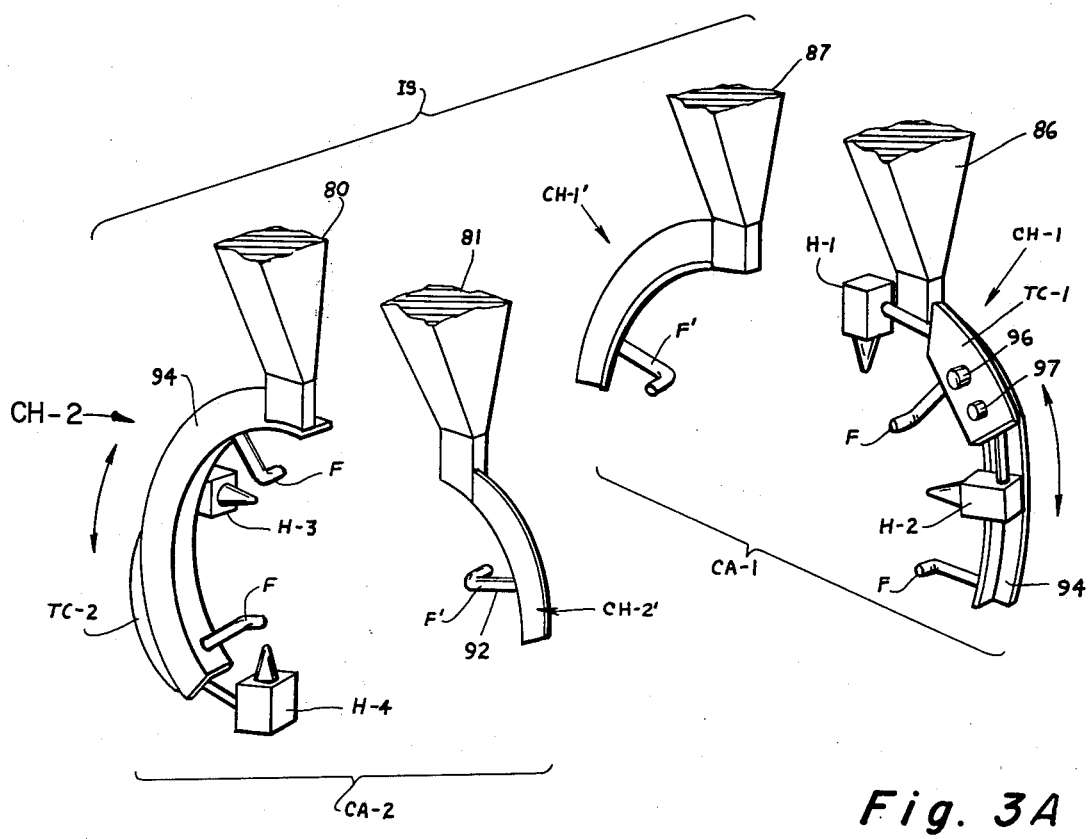
FIG. 3A is a fragmentary pictorial view of the inner assembly taken from the viewpoint of FIG. 3, showing the spatial relation of the welding assembly portion of the welding station in FIG. 2.
Figure 3:
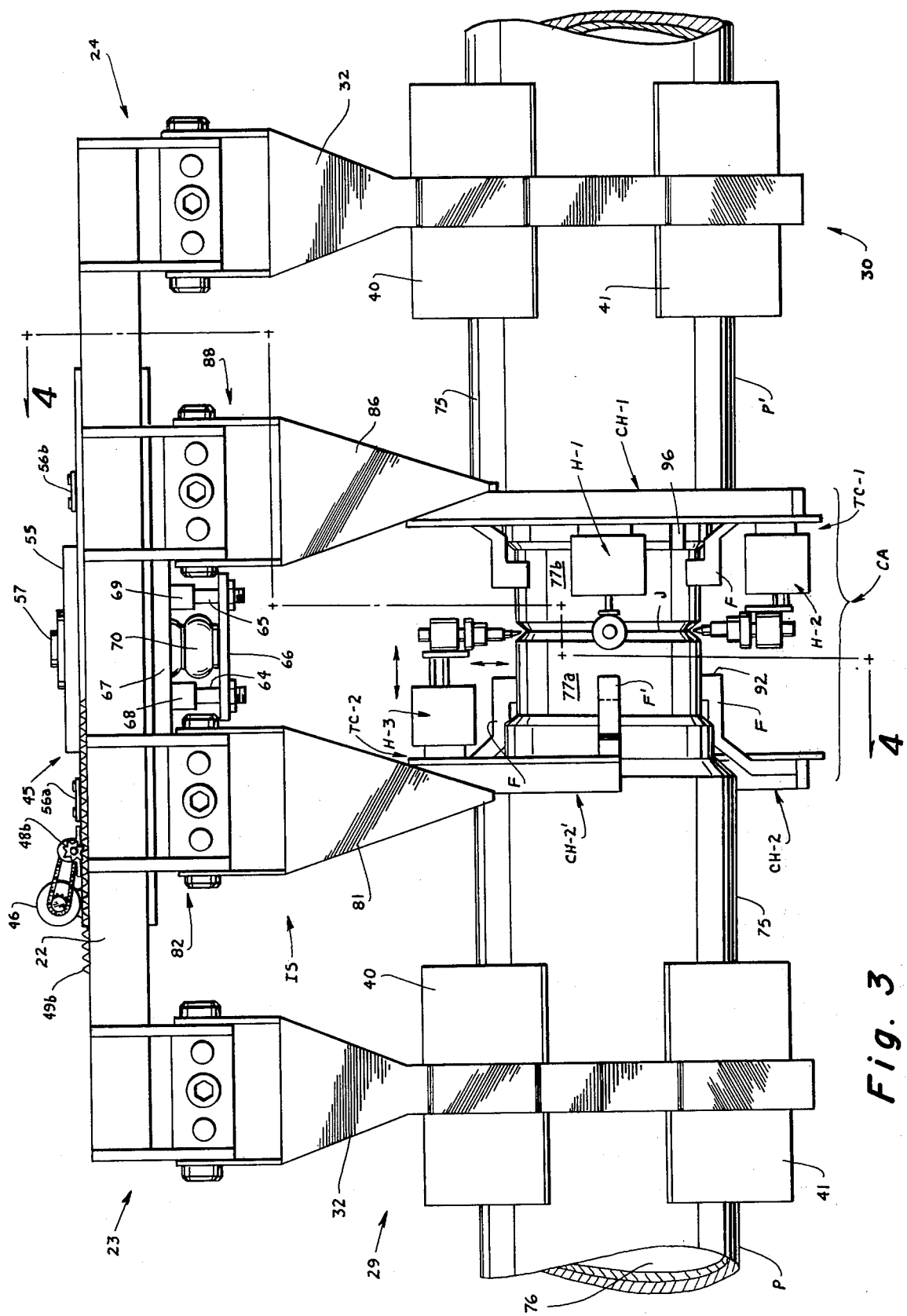
FIG. 3 is a vertical plan view of the welding station shown in FIG. 2.

A pair of guide rods 64 and 65 are attached to the support member 60 and extend downwardly into engagement with the end plate 66, best shown in FIG. 3. A channel member 67, having a longitudinal dimension aligned with the support member 60, is retained between the support member 60 and the end plate 66 by apertures through which the two guide rods 64 and 65 are slidably received. The bushings 68 and 69 guide the sliding movement of the channel member 67 along the guide rods 64 and 65. A selectably expandable device such as the inflatable air bag 70 or the like is interposed between the end plate 66 and the channel member 67, so that the channel member can be selectably raised or lowered within limits determined by the free travel of the channel member along the guide rods 64 and 65. The entire inner assembly IS is thus able to move along the axes of freedom relative to the inner support frame 45.

The pipe sections P frequently surround the steel pipe 76 with an outer protective layer 75 of cementitious material or the like, and the protective layer 75 is missing from each end of the pipe sections to permit access of welding torches to the pipe joint J, as best shown in FIG. 3. The outer clamp assemblies 29 and 30 grip the protective coating 75 of the respective pipe sections P and P', providing the main support for the entire first welding station A and providing only an approximate positioning of the welding station relative to the pipe 76 within the protective coating. After the protective coating of the pipe is engaged by the outer clamp assemblies 29 and 30 and the inner assembly IS has been positioned relative to the joint J, the inner assembly is clamped onto the pipe joint ends 77a and 77b of the respective pipe sections P and P'.

The inner assembly IS, in the disclosed embodiment of the present invention, includes two split clamp assemblies which removably engage the pipe sections, one clamp assembly per pipe joint end. Each clamp assembly comprises a pair of half-clamps, and each pair of half-clamps includes a track and a carriage assembly which moves therealong in a path which is parallel to the pipe joint being welded. Two welding head assemblies are attached to each carriage assembly and are movable therewith about the track, with the two welding head assemblies on each carriage being offset approximately 90° apart about the carriage track. The two clamp assemblies have substantially identical configurations, in mirror image, and the two carriages associated with the two clamp assemblies are each driven through approximately 90° of travel so that each of the four welding head assemblies contributes approximately 90° of a complete circular weld pass on the pipe joint.

The foregoing general configuration and arrangement of the inner assembly IS is best seen in FIGS. 3 and 3A, in which the two clamp assemblies CA1 and CA2 each include the corresponding half-clamps CH1, CH1' and CH2, CH2'. The half-clamp CH1' is hidden from view in FIG. 3 by the pipe section P', while the substantial portion of the half-clamp CH2 is hidden by the pipe section P in that Figure.

Each of the half-clamps CH2 and CH2' are supported by a corresponding pair of inner clamp arms 80 and 81 which are suspended below the inner clamp cam assembly 82. The inner clamp cam assembly is identical in construction and operation to the outer clamp cam assemblies 23 and 24, described above, with a motor 83 (FIG. 4) being connected to drive a lead screw which selectively moves the inner clamp arms 80 and 81 toward or away from each other.

The half-clamps CH1 and CH1' of the clamp assembly CA1 are likewise suspended from the pair of inner clamp arms 86 and 87, and these two inner clamp arms are suspended from the inner clamp cam assembly 88. The inner clamp cam assembly 88 is identical in construction and operation to the other clamp cam assemblies, and it will be understood that the inner clamp cam assembly 88 includes a lead screw which is power-operated to open or close the inner clamp arms 86 and 87, with respect to each other, along a path which is transverse to the longitudinal dimension of the pipe sections P and P'.

Each of the inner clamp cam assemblies 82 and 88 is suspended from the channel member 67 for gimballed movement with respect to the outer frame and the outer clamp assemblies, which may be securely engaging the pipe sections P and P'.

Each of the half-clamps CH1' and CH2' supports a clamp foot F' which extends radially inwardly from the half-clamp for engaging the respective pipe joint ends 77a and 77b. Each of the clamp feet F' terminates in a pipe-engaging member 92 that is longitudinally offset from the corresponding supportive half-clamp and is spaced radially inwardly therefrom, as best seen in FIGS. 3 and 3A, so that the pipe engaging member 92 can be moved into contact with the uncovered pipe joint ends 77a and 77b while the half-clamps CH1' and CH2' can remain positioned along side the protective coating 75. This longitudinal offset of the clamp feet allows the half-clamps, along with the inner clamp arms 80, 81 and 86, 87, to be longitudinally offset from the joint J to allow room for the welding torch apparatus.

Figure 4:
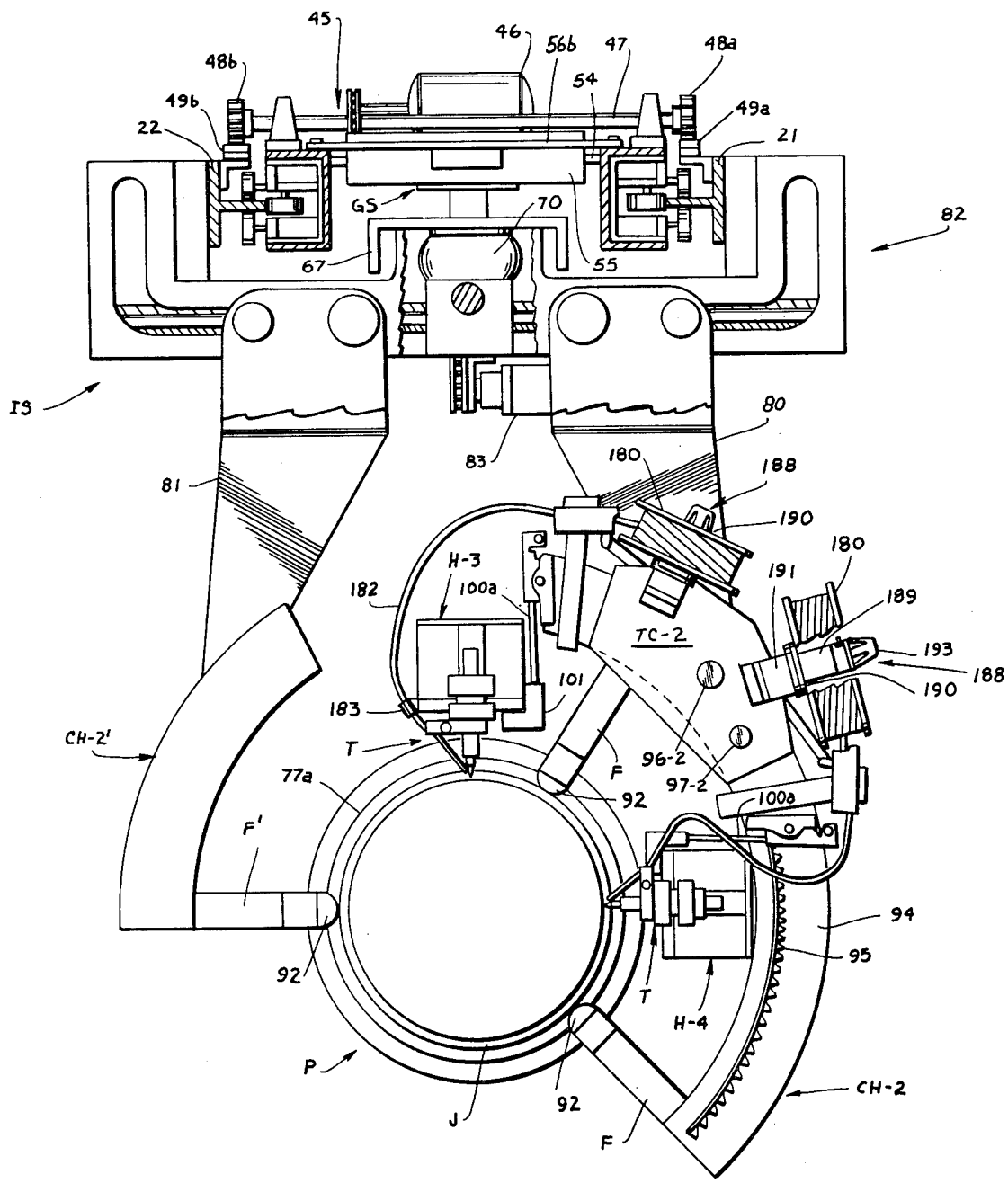
FIG. 4 is a vertical section view taken along line 4—4 of FIG. 3.

Each of the half-clamps CH1 and CH2 supports a pair of clamp feet F which may be substantially identical to the aforementioned clamp foot F'. As best seen in FIGS. 3A and 4, the three clamp feet F, F, and F' of each clamp assembly CA1 and CA2 provide a symmetrical three-point clamp for one of the joint ends 77a and 77b which comprise the joint J. Each of the clamp assemblies CA1 and CA2 independently engages or disengages the corresponding joint end 77b or 77a as the lead screw associated with the inner clamp cam assembly 82 or 88, respectively, is rotated in the proper direction. Once the vertical position of the inner assembly IS has been adjusted by the air bag 70 so that the overall clamp assembly CA (FIG. 3) is concentric with respect to a pipe joint J, it will be seen that the gimbal support assembly GS permits the clamp assembly to undergo three-point engagement with the pipe joint end notwithstanding some degree of misalignment between the clamp assembly CA and the overall support assembly including the rails 21 and 22 of the welding station.

Each of the half-clamps CH1 and CH2 is constructed to provide a track 94 which is parallel to a circumferential portion of the pipe joint J. Each track 92 supports the movable carriage TC for traverse in an arc about the pipe joint J. The carriage TC1 is mounted on the track associated with the half-clamp CH1, as best seen in FIG. 3, and carries a pair of welding head assemblies H1 and H2. The carriage TC2 mounted on the half-clamp CH2 carries another pair of welding head assemblies H3 and H4. The two welding head assemblies on each carriage are positioned at a right angle to each other and are longitudinally offset from the respective half-clamp a distance which places all of the four welding head assemblies in alignment with a common plane which is alignable, by appropriate positioning of inner assembly IS, with the joint J.

A rack gear 95 is mounted on each of the half-tracks CH1 and CH2, and each of the carriages is provided with a drive motor 96 which engages the rack gear and moves the carriage along the arc-shaped track 94 about the respective half-clamp. The drive motor 96 is preferably a precision motor such as a velocity feedback servo drive motor or the like which is capable of moving the carriage along the track at a precisely controlled rate in response to appropriate input signals. Each carriage also includes a position encoder which provides an output signal corresponding to the exact position of the carriage on the track 94 at all times. The position encoder 97 may engage the rack gear 95 to sense carriage movement along the track.

Since the welding head assemblies H3 and H4 are at the 12 o'clock and 3 o'clock positions, respectively, when the carriage TC2 is at its upper position of travel along the track 94 of the half-clamp CH2, clockwise motion of the carriage TC2 90° along the track 94 will place the assembly H3 at the 3 o'clock position and the assembly H4 at the 6 o'clock position so that 180° of the pipe joint J are traversed by the 90° movement of the carriage TC2. Similar coverage of the remaining 180° of the pipe joint J is obtained by the welding head assemblies H1 and H2 and with 90° rotation of the carriage TC1. Since all of the welding heas assemblies are longitudinally offset from their carriages to occupy a common plane which is substantially perpendicular to the pipe joint J, the "at rest" or starting position of the carriage TC1 is displaced from 12 o'clock sufficiently to remove assembly H1 from interference with assembly H3 of carriage TC2. The carriage TC1 is moved upwardly to its 12 o'clock position to initiate its portion of a welding pass only after the carriage TC2 has moved downwardly far enough to provide clearance for the welding head assembly H1. A complete operating sequence of the welding system is set forth below.

It will be understood that the foregoing relates only to a preferred embodiment of the present invention, and that numerous changes and modifications may be made therein without departing from the spirit and the scope of the invention as set forth in the following claims.

We claim:

1. Apparatus for welding a circumferential joint interconnecting adjacent lengths of pipe which have an outer protective layer, comprising:
    first means for selectably clamping onto said outer protective layer of said adjacent lengths of pipe so as to be supported by said pipe lengths while spanning said joint;
    second means supported by said first means for a limited extent of movement in plural degrees of freedom relative to said first means to permit said second means to assume a certain alignment with a joint that may be angularly and axially misaligned relative to said outer protective layer on the pipe;
    clamp means carried by said second means for clamping said second means to portions of said lengths of pipe lacking said protective layer and in fixed relation to said joint,
    track means carried by said second means and defining a predetermined path of movement in proximate circumferential relation to said joint,
    carriage means supported for movement about said track means; and
    welding torch means carried by said carriage means in welding relation with said joint.

2. Apparatus as in claim 1, wherein said second means is supported on said first means by gimbal means which permits said second means to be positioned in said plural degrees of freedom for said proximate alignment of said track means with said joint while said first means remains securely clamped to said outer protective layer of said lengths of pipe.

3. Apparatus as in claim 1, wherein:
    said clamp means comprises a pair of clamp arms each of which extends about a portion of the circumference of said pipe;
    each of said clamp arms being selectably movable laterally of the length of said pipe, and each of said clamp arms having means to contact one of said lengths of pipe as said clamp arms are moved laterally inwardly toward said pipe; and
    one of said clamp arms supporting said track means.

4. Apparatus as in claim 3, wherein said welding torch means is a first such means, and further comprising a second welding torch means carried by said carriage means in circumferentially offset relation to said first torch means.

5. Apparatus as in claim 1, wherein:
    said clamp means comprises a first inner clamp means and a second inner clamp means longitudinally spaced apart from each other, so that one said clamp means may be positioned in clamping relation with a respective one of said adjacent lengths of pipe in proximity to said joint;

each of said inner clamp means having a pair of clamp arms each of which extends about a separate circumferential portion of the respective length of said pipe;

each of said clamp arms of each said inner clamp means being selectably movable laterally of the pipe length, and each of said clamp arms having means to contact the respective lengths of pipe as said clamp arms are moved laterally inwardly toward said pipe;

one of said clamp arms of said first inner clamp means supporting a first said track means which extends about a first circumferential portion of one of said lengths of pipe, and one of said clamp arms of said second inner clamp means supporting a second said track means which extends about a second circumferential portion of the other said length of pipe;

said carriage means is a first such means supported for movement about said first track means, and including a second carriage means supported for movement about said second track means; and at least one said welding torch means carried by each of said carriage means in welding relation with said joint.

6. Apparatus as in claim 5, wherein at least one of said carriage means carries a plurality of said welding torch means in circumferentially offset relation to each other.

7. Apparatus as in claim 1, wherein:

said second means includes means which is supported for longitudinal movement along said pipe lengths relative to said first means and which carries said clamp means.

8. Apparatus as in claim 1, wherein:

said second means comprises support means selectably longitudinally movable relative to said first means so as to assume a predetermined position along said lengths of pipe relative to said joint;

means interconnecting said support means and said clamp means to permit said clamp means to rotate about an axis parallel to said pipe, to rotate about a horizontal axis perpendicular to said pipe, and to rotate about a vertical axis perpendicular to said pipe; and means selectably operative to adjust the vertical spacing between said support means and said clamp means, so that said clamp means can be moved relative to said first means so as to assume said predetermined alignment with said joint while said first means remains clamped onto the outer protective layer of the pipe.

9. Apparatus as in claim 1, wherein:

said first means comprises a pair of clamping assemblies mounted on opposite ends of a structure;

each of said clamping assemblies comprising a pair of clamping arms which have mutually opposed means for clamping onto said outer protective layer of a length of said pipe;

clamp actuating means separately mounting each pair of said clamping arms laterally of said length of pipe for selectable lateral movement either toward or away from clamping relation with said pipe; and means operative to swing each paired clamping arm upwardly and away from said length of pipe when said clamping arms move a predetermined distance laterally away from the pipe, so that the entire said apparatus can be rapidly withdrawn from the proximity of the joint without interference from the pipe.

10. Apparatus as in claim 9, wherein said pair of clamping assemblies of said first means comprises an outer clamping assembly; and wherein said clamp means carried by said second means is an inner clamping assembly comprising a pair of clamping assemblies each of which has a pair of inner clamping arms;

means separately mounting each pair of said inner clamping arms for lateral movement either toward or away from said pipe portion which lacks said protective layer; and means operative to swing each said inner clamping arm upwardly and away from said pipe portion when said inner clamping arms have moved a predetermined distance laterally away from the pipe joint.

* * * * *